United States Patent
Taniguchi et al.

(10) Patent No.: US 10,734,853 B2
(45) Date of Patent: Aug. 4, 2020

(54) ROTATING ELECTRIC MACHINE WITH VARIOUS RATIOS FOR PERMANENT MAGNETS AND HOLES, ROTOR SALIENT AND MAGNETIC POLES, ROTOR LAMINATIONS, AIR GAPS AND STATOR TOOTH THICKNESS

(71) Applicant: DENSO CORPORATION, Kariya, Aichi-pref. (JP)

(72) Inventors: Makoto Taniguchi, Obu (JP); Hiroki Tomizawa, Chiryu (JP)

(73) Assignee: DENSO CORPORATION, Kariya (JP)

( * ) Notice: Subject to any disclaimer, the term of this patent is extended or adjusted under 35 U.S.C. 154(b) by 1108 days.

(21) Appl. No.: 14/101,391

(22) Filed: Dec. 10, 2013

(65) Prior Publication Data
US 2014/0159534 A1  Jun. 12, 2014

(30) Foreign Application Priority Data
Dec. 10, 2012  (JP) .................................. 2012-269253
Dec. 3, 2013  (JP) .................................. 2013-249961

(51) Int. Cl.
*H02K 1/27* (2006.01)
*H02K 29/03* (2006.01)

(52) U.S. Cl.
CPC .......... *H02K 1/2746* (2013.01); *H02K 29/03* (2013.01); *H02K 2213/03* (2013.01)

(58) Field of Classification Search
CPC ...... H02K 2213/03; H02K 1/27; H02K 29/03; H02K 1/2706; H02K 1/276; H02K 1/2766; H02K 1/2713; H02K 1/272; H02K 1/2726; H02K 1/2733; H02K 1/274; H02K 1/2753; H02K 1/2773; H02K 1/278; H02K 1/2786; H02K 21/16
(Continued)

(56) References Cited

U.S. PATENT DOCUMENTS 5,223,759 A  6/1993  Shimoda et al.
5,369,325 A  11/1994  Nagate et al.
(Continued)

FOREIGN PATENT DOCUMENTS

JP  2012-016129  1/2012

OTHER PUBLICATIONS

EIC 2800 Search Report STIC Database Tracking No. 499744 by Benjamin Martin dated Nov. 9, 2015.*
(Continued)

*Primary Examiner* — Maged M Almawri
(74) *Attorney, Agent, or Firm* — Nixon & Vanderhye PC

(57) ABSTRACT

A rotating electric machine is equipped with a consequent-pole type rotor that includes a magnetic pole having a permanent magnet buried therein and a soft magnetic material pole that interposes two magnetic poles. The thickness of the permanent magnet and a circumferential width of the soft magnetic material pole have a relationship that prevents a spread of magnetic flux distribution in the circumferential direction within a gap between the soft magnetic material pole and a stator. As a result, a magnetic flux density difference in the circumferential direction is prevented, which enables a reduction of cogging torque based on an effective reduction of low-frequency space order components that originate from components other than a main component.

12 Claims, 6 Drawing Sheets

(58) Field of Classification Search
USPC ........ 310/156.01–156.84, 216.001, 216.097, 310/216.111
See application file for complete search history.

(56) References Cited

U.S. PATENT DOCUMENTS

| | | | |
|---|---|---|---|
| 5,508,576 A | 4/1996 | Nagate et al. | |
| 5,631,512 A * | 5/1997 | Kawabata | H02K 1/278 310/156.15 |
| 5,679,995 A * | 10/1997 | Nagate | H02K 1/2746 310/156.45 |
| RE36,367 E | 11/1999 | Nagate et al. | |
| 6,047,460 A * | 4/2000 | Nagate | H02K 1/276 205/137 |
| 6,087,752 A * | 7/2000 | Kim | H02K 1/2766 310/156.56 |
| 8,179,011 B2 * | 5/2012 | Takemoto | H02K 1/276 310/156.53 |
| 8,242,654 B2 * | 8/2012 | Yamada | H02K 1/2746 310/156.54 |
| 8,319,386 B2 * | 11/2012 | Yamada | H02K 1/2746 310/156.45 |
| 8,405,269 B2 * | 3/2013 | Spaggiari | H02K 1/276 310/156.45 |
| 2007/0273241 A1 * | 11/2007 | Niguchi | H02K 21/16 310/216.001 |
| 2009/0134731 A1 * | 5/2009 | Okumoto | H02K 1/278 310/156.38 |
| 2010/0308680 A1 * | 12/2010 | Yamada | H02K 1/2746 310/156.54 |
| 2011/0278978 A1 | 11/2011 | Taniguchi et al. | |
| 2011/0309707 A1 * | 12/2011 | Kato | H02K 1/146 310/156.54 |
| 2012/0278978 A1 | 11/2012 | Taniguchi et al. | |

OTHER PUBLICATIONS

STIC EIC 2800 Search Report by Benjamin Martin 11092015.*
Office Action (3 pages) dated Nov. 27, 2014, issued in corresponding Japanese Application No. 2013-249961 and English translation (4 pages).

* cited by examiner

ROTATING ELECTRIC MACHINE WITH VARIOUS RATIOS FOR PERMANENT MAGNETS AND HOLES, ROTOR SALIENT AND MAGNETIC POLES, ROTOR LAMINATIONS, AIR GAPS AND STATOR TOOTH THICKNESS

CROSS-REFERENCE TO RELATED APPLICATION

This application is based on and claims the benefit of priority of Japanese Patent Application No. 2012-269253 filed on Dec. 10, 2012 and Japanese Patent Application No. 2013-249961 filed on Dec. 3, 2013, the disclosures of which are incorporated herein by reference.

TECHNICAL FIELD

The present disclosure generally relates to a rotor and a rotating electric machine that has a rotor.

BACKGROUND

Generally, rare-earth magnets are commonly used in motors and generators because they allow the motors and generators to be more compact in size. However, the supply of rare-earth magnets is not sustainable due to limited availability and skewed supply locations. Therefore, it is desirable to reduce the amount of rare-earth magnets in motors and generators.

For example, a patent document 1 (i.e., Japanese Patent Laid-Open No. 2010-252530) discloses a consequent-pole type rotor in which a permanent magnet is positioned within every other pole. That is, when the first and second salient poles are alternatively arranged in a circumferential direction, a permanent magnet is only positioned in the first salient pole. In such a consequent-pole type rotor, the second salient pole is "consequently" magnetized to have an inner face side pole of the permanent magnet that is buried in the adjacent salient pole, which results in an alternative arrangement of N poles and S poles on the rotor's surface. As a result, the number of permanent magnets is reduced in half, thereby simultaneously reducing cost and procurement risk.

However, a consequent-pole type rotor may suffer from cogging torque due to the interaction between the permanent magnets. As a result, cogging torque may produce torque output fluctuations at low speeds and reduce motor efficiency.

The magnitude of the cogging torque depends upon the dimension of the motor components. More specifically, the magnetic flux distribution in a gap between a stator and a rotor of a motor is controlled and determined only by a main component having a high-frequency variation, which may also be designated as a space order component having the same number as the number of teeth on the stator, if other and/or accompanying components of the cogging torque having lower frequencies are sufficiently decreased. Therefore, the distribution of the magnetic fluxes, respectively departing from a permanent magnetic pole and landing on a soft magnetic material pole, substantially controlled by the high frequency variation of the cogging torque has a smaller variation amplitude, thereby resulting in a smaller magnitude of the cogging torque due to a smaller variation of attractive force that attracts the rotor.

The magnitude of cogging torque that is generated by a skewed distribution of the magnetic flux is correlated to a space order of the magnetic flux, that is, to a frequency of change of the magnetic flux in time. That is, the smaller the frequency of the change of a certain subject space order is, the greater the amplitude of the component of the cogging torque in the subject space order would be. Therefore, ideally, the main component of the magnetic flux is maximized for the reduction/removal of the other lower-order components of the magnetic flux.

For example, when the number of teeth of the stator is 12, a main component of the cogging torque has a 12th order, and when the number of teeth is 48, a main component of the cogging torque has a 48th order. In such case, the cogging torque is preferably designed to include as few other lower-order components as possible. This occurs because the amplitude of vibration becomes smaller for higher frequency when an excitation energy is constant.

SUMMARY

It is an object of the present disclosure to provide a rotor that reduces a cogging torque of a rotating electric machine.

In an aspect of the present disclosure, a rotor of a rotating electric machine of the present disclosure includes a rotation axis, a rotor boss fixed on the rotation axis, a plurality of soft magnetic material poles extending radially outward from the rotor boss, a plurality of magnetic poles extending radially outward from the rotor boss and separated from the plurality of soft magnetic material poles by a circumferential gap, and a permanent magnet that is buried in the respective magnetic poles. The rotor of the rotating electric machine has a relationship such that d0 is defined as a product of a radial thickness in millimeters of the permanent magnet and a number of soft magnetic material poles, w0 is defined as a product of a circumferential width in millimeters of each soft magnetic material pole and the number of soft magnetic material poles, and $360 \leq (w0^2/d0) \leq 400$.

In another aspect of the present disclosure, a rotating electric machine of the present disclosure includes a rotation axis, a rotor boss fixed on the rotation axis, a plurality of soft magnetic material poles extending radially outward from the rotor boss, a plurality of magnetic poles extending radially outward from the rotor boss and separated from the plurality of soft magnetic material poles by a circumferential gap, and a permanent magnet that is buried in each of the plurality of magnetic poles. A yoke has a cylindrical shape for connecting a plurality of teeth that are positioned along an outer periphery of the yoke. The plurality of teeth extends radially inward toward the rotor from the outer periphery of the yoke. A winding is disposed in a slot that is defined as a space between two teeth, such that d0 is defined as a product of a radial thickness in millimeters of the permanent magnet and a number of soft magnetic material poles, w0 is defined as a product of a circumferential width in millimeters of each soft magnetic material pole and the number of soft magnetic material poles, and $360 \leq (w0^2/d0) \leq 400$, and G is defined as a circumferential width of the gap on a circumferential edge of the rotor between each magnetic pole and each soft magnetic material pole, B is defined as a circumferential width of an inner end of each tooth (along an inner circumferential edge of the inner end, and G<B.

When the permanent magnet is thick in the radial direction, a magnetomotive force increases, resulting in a greater number of effective magnetic fluxes provided for the rotor side, if the same magnetic resistance is assumed for a magnetic loading machine. On the other hand, a greater amount of magnetic flux returns to the soft magnetic material pole, thereby improving the spread of the magnetic flux distribution in the circumferential direction within the gap between the soft magnetic material pole and the stator. Therefore, when the circumferential width of the soft magnetic material pole is not appropriate, a magnetic flux density may be easily diverted in the poles along the circumferential direction, which may generate lower-order components of the cogging torque originating from components other than the main component.

In contrast, when the above relationship is established between the radial thickness of the permanent magnet in the radial direction and the circumferential width of the soft magnetic material pole, the magnetic flux components in the gap between the stator and the rotor are controlled to have very small magnitudes in the space order other than the main component. Therefore, the cogging torque of the motor is reduced in magnitude.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

One embodiment of the present disclosure is described in the following based on the drawings.

Figure 1:
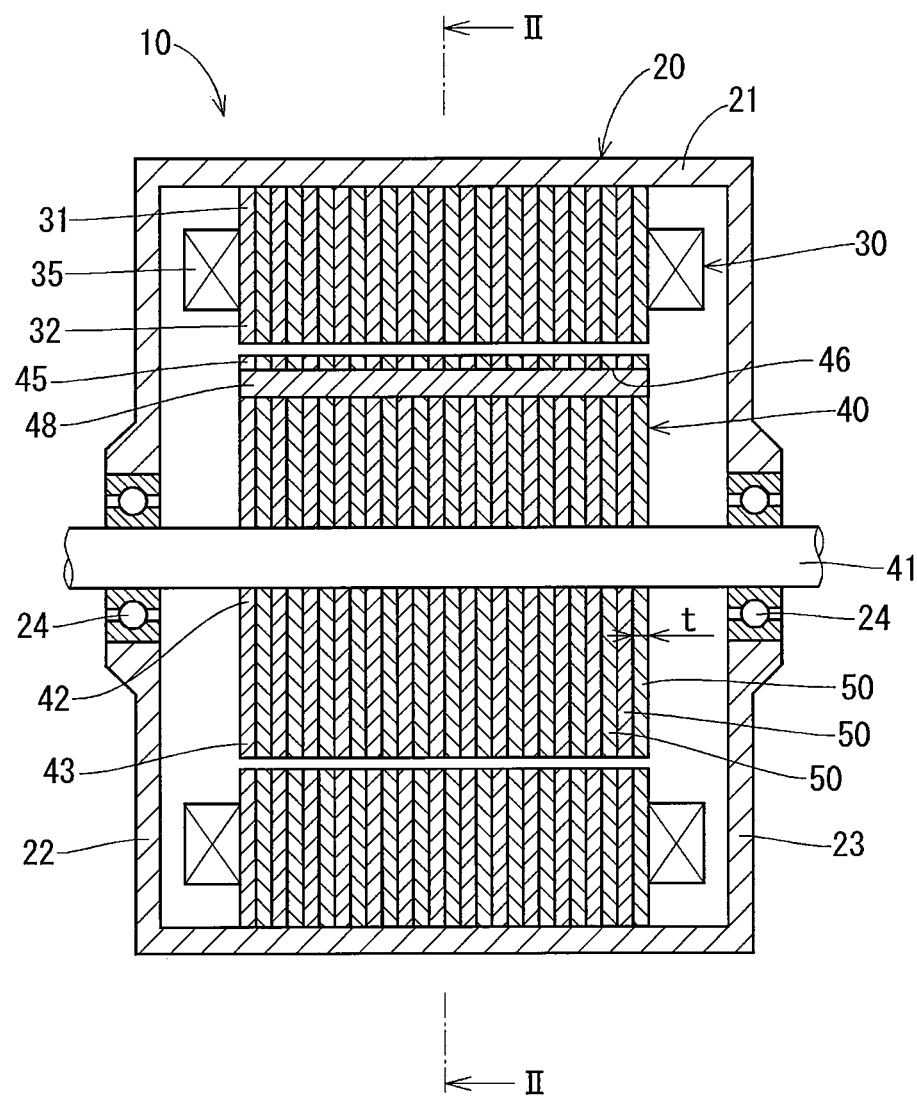
FIG. 1 is a vertical cross sectional view of a motor in a first embodiment of the present disclosure.

The present disclosure is described as a "rotating electric machine" which has a rotor described in detail in the following, which is shown in FIG. 1 and in other drawings. In the present embodiment, a motor configuration of a motor 10 is described in FIG. 1 to FIG. 3. The motor 10 includes a housing 20, a stator 30 and a rotor 40 to be serving as a three-phase brushless motor.

The housing 20 includes a cylindrical portion 21 and a first side portion 22 for enclosing one side of the cylindrical portion 21 and a second side portion 23 for enclosing the other side of the cylindrical portion 21. A bearing 24 is installed at a center of the first side portion 22 and at a center of the second side portion 23.

Figure 2:
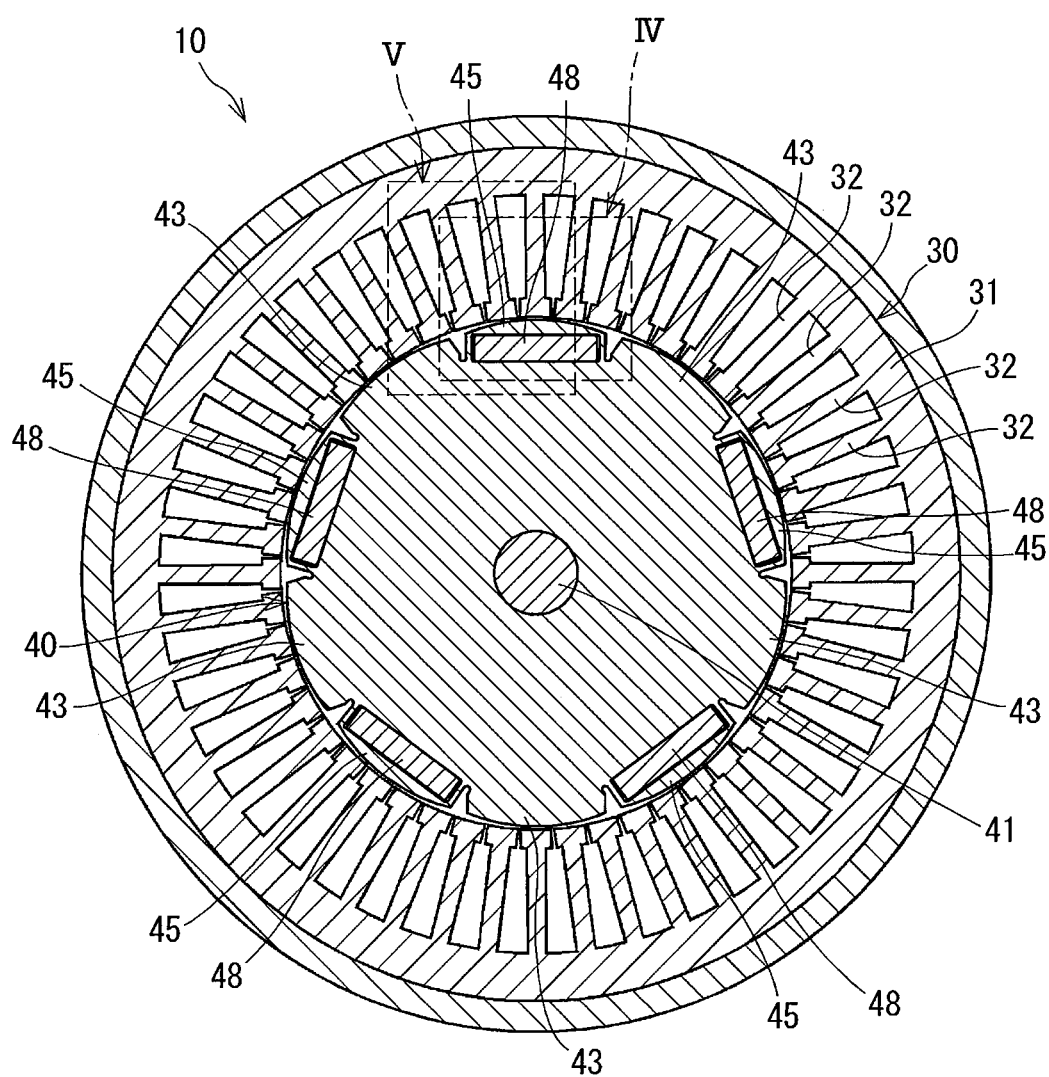
FIG. 2 is a cross sectional view of FIG. 1 along a line II-II.
Figure 3:
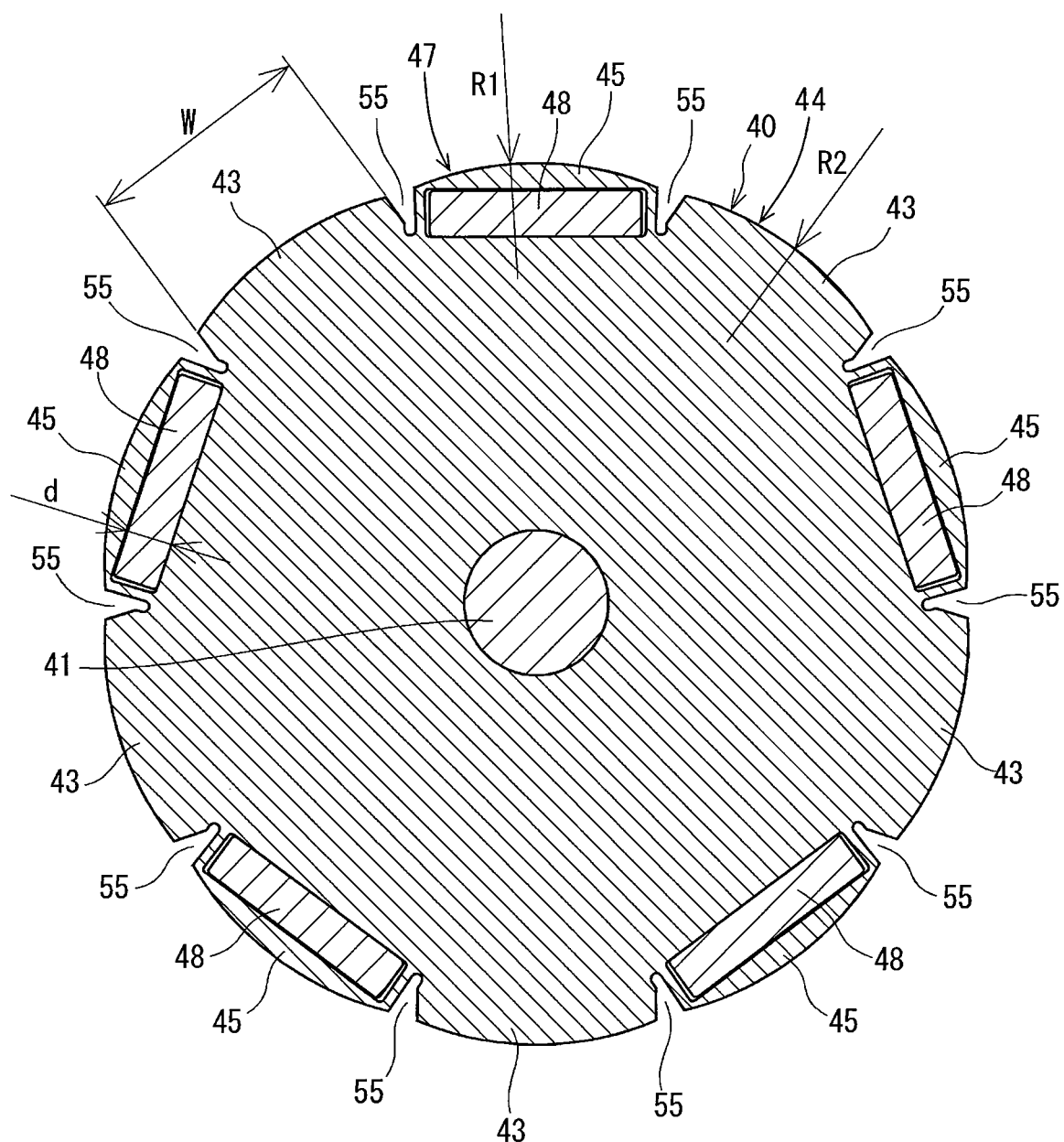
FIG. 3 is a cross sectional view of a rotor in FIG. 2 along a plane that is perpendicular to a rotation axis of the motor.

The stator 30 is an armature of the motor 10, and includes a yoke 31, plural teeth 32 and plural windings 35. The yoke 31 is formed in the shape of a cylinder, and, is press-fitted into an inner wall of the cylindrical portion 21 of the housing 20, for example. Each of the plural teeth 32 extends radially, and is formed in a single body with the yoke 31. The yoke 31 serves as a connecting part to connect together each of the plural teeth 32 at an outer ends in the radial direction. The winding 35 is disposed in a slot 36 that is defined as a space between two teeth 32. The winding 35 includes a U-phase winding, a V-phase winding and a W-phase winding. In FIG. 2, the winding 35 is not shown in the drawing for the clarity of other parts.

The rotor 40 is a permanent field magnet of the motor 10, and includes a rotation shaft 41, a rotor boss 42, plural soft magnetic material poles 43, plural magnet poles 45 and plural permanent magnets 48. The rotation shaft 41 is rotatably supported by the bearing 24. The rotor boss 42 is formed in the shape of a cylinder, and, is press-fitted to the rotation shaft 41, for example. Each of the soft magnetic material poles 43 is a salient pole protruding or extending from the rotor boss 42 in the radially outward direction of the motor 10. The plural soft magnetic material poles 43 are disposed with a gap interposed therebetween in the circumferential direction. Each of the magnetic poles 45 is also a salient pole protruding or extending from the rotor boss 42 in the radially outward direction of the motor 10. One magnetic pole 45 is provided at a position between the two soft magnetic material poles 43.

The permanent magnet 48 is made from a rare-earth magnet, and is buried in the magnetic pole 45. The magnetic pole 45 is, more practically, formed to have an accommodation aperture 46 that axially penetrates the rotor 40, and the permanent magnet 48 is housed and accommodated in the accommodation aperture 46. Each permanent magnet 48 is arranged in the aperture 46 to have the same pole (i.e., either a N pole or a S pole) facing outward of the rotor 40. An outer wall of the magnetic pole 45, which is on an outside in the radial direction, is magnetized to have the same pole as an outside pole of the permanent magnet 48 in the radial direction.

On the other hand, an outer wall of the soft magnetic material pole 43, which is on an outside in the radial direction, is magnetized to have an opposite pole as the pole on the outside of the permanent magnet 48 in the radial direction.

The rotor 40 is a consequent-pole type rotor, which has the soft magnetic material poles 43 and the magnetic poles 45 that are alternatingly arranged as plural type poles in the circumferential direction.

The features of the motor 10 are described in the following based on FIG. 1 to FIG. 7.

An outer diameter of the rotor 40 in the motor 10 is smaller than 60 [mm], and is used as a power source of a vehicular electric power steering.

The iron core of the rotor 40, which includes the rotor boss 42, the soft magnetic material pole 43 and the magnetic pole 45, is formed as layered board members 50 that are layered along the axial direction. The number of the soft magnetic material poles 43 is the same as the number of magnetic poles 45. In the present embodiment, the rotor 40 has five soft magnetic material poles 43 and five magnetic poles 45. Therefore, the total number of magnetic poles on the rotor 40 is ten.

A gap 55 is defined in the circumferential direction between the soft magnetic material pole 43 and the magnetic pole 45. In other words, the magnetic pole 45 is separated from the soft magnetic material pole 43 by a circumferential gap 55. The circumferential width of the gap 55 increases $3o$ towards an outer radial direction.

The permanent magnet 48 is formed in a board shape, and a thickness direction of the permanent magnet 48 is aligned with the radial direction of the rotor 40.

The teeth 32 of the stator 30 are formed to have a leg portion 33 that extends inward from the yoke 31 and a brim part 34 that is positioned at an inner end of the leg portion in the radial direction.

The teeth 32 are disposed in 60 pieces at constant intervals in the circumferential direction. The number of slots 36 is thus 60. The winding 35 is wound as a full-pitch winding.

When the radial thickness in millimeters of one permanent magnet 48 in the radial direction is designated as a d [mm] and the circumferential width in millimeters of one soft magnetic material pole 43 in the circumferential direction is designated as a w [mm], and the number of the soft magnetic material poles is designated as p, the dimension of the motor 10 is generally optimized by using the following relationships of (1) and (2).

$$d \propto 1/p \quad (1)$$

$$w \propto 1/p \quad (2)$$

Therefore, when the thickness d of the permanent magnet 48 is defined in an equation (3) and the circumferential width w of the soft magnetic material pole 43 is defined in an equation (4), a no-load time cogging torque can be evaluated by using an evaluation value E [mm] from an equation (5), which serves as an index, and which shows a relatively high correlation between d and w.

$$d = d0/p \quad (3)$$

$$w = w0/p \quad (4)$$

$$E = w0^2/d0 \quad (5)$$

Figure 6:
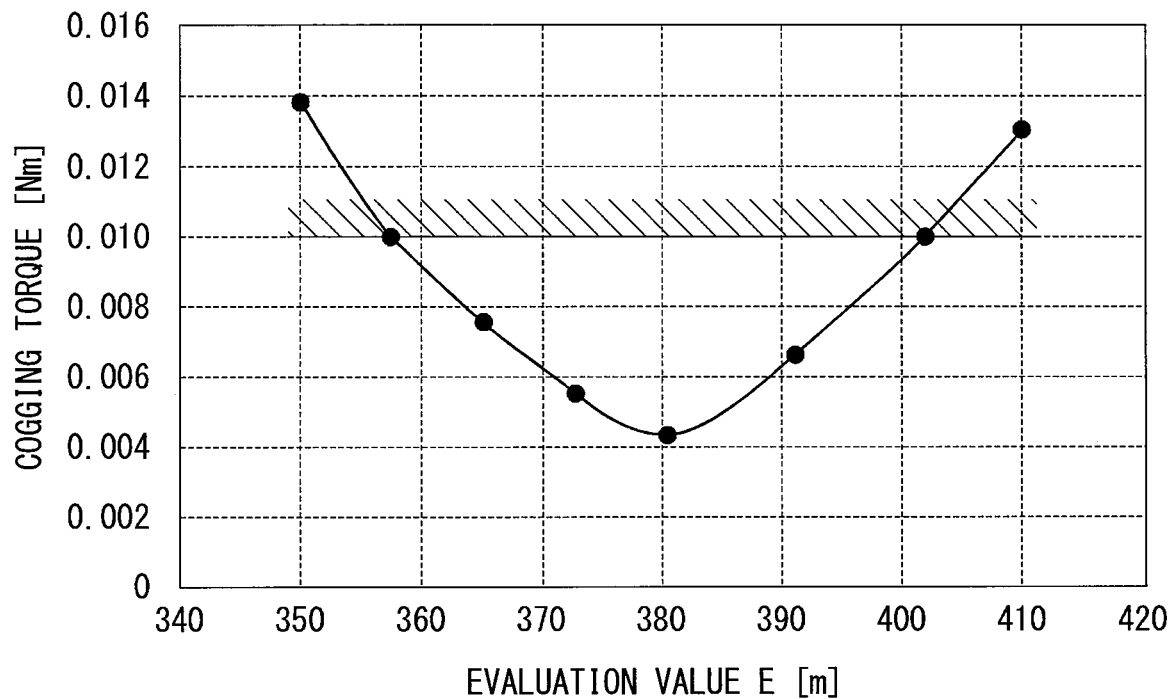
FIG. 6 is a diagram of change of cogging torque according to a change of an evaluation value.

FIG. 6 shows a change of the cogging torque according to the change of the evaluation value E. As easily seen from the diagram in FIG. 6, the relationship of an equation (6) needs to be fulfilled, for having a cogging torque value to be equal to or smaller than a desired value (e.g., 0.01 [Nm]). In the present embodiment, the evaluation value E is set to 380.

$$360 \leq (w0^2/d0) \, [\text{mm}] \leq 400 \quad (6)$$

Figure 7:
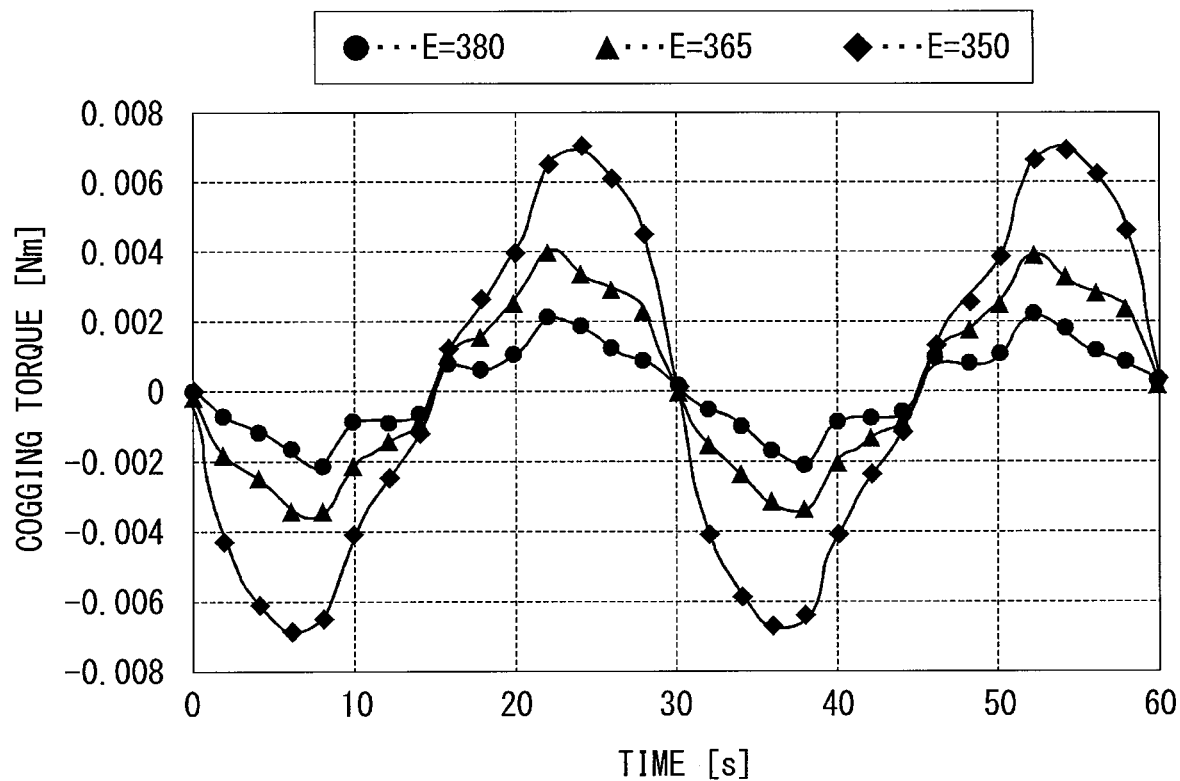
FIG. 7 is a diagram of the torques according to time in three embodiments in which the evaluation values are respectively different.

FIG. 7 shows an evaluation value E of 380 [mm] in the present embodiment, an evaluation value E of 365 [mm] in a first comparative example, and an evaluation value E of 350 [mm] in a second comparative example, about the time change of the torque when the rotor 40 is rotated in a non-excitation state. In a waveform that yields a smaller cogging torque, few wave motion components in low frequencies are observed, which is intended by the present embodiment. That is, when the magnetic load is appropriately designed, the magnetic flux in the gap is evenly distributed among the teeth 32 of the stator 30, thereby decreasing the low frequency components due to the skewed distribution of the magnetic flux. Such relationship is especially noticeable with small-sized brushless motors that are used in vehicle electric power steering systems, which have a diameter of the rotor 40 being equal to or smaller than 60 millimeters [mm].

The other features regarding the dimension of various parts are described in the following.

When a circumferential width of the gap 55 on a circumferential edge of the rotor between each magnetic pole and each soft magnetic material pole is designated as G, and a circumferential width of an inner end of each tooth 32 along an inner circumferential edge of the inner end of each tooth 32 is designated as B (see FIG. 4), the following relationship shown in an equation (7) is observed.

$$G < B \quad (7)$$

Figure 5:
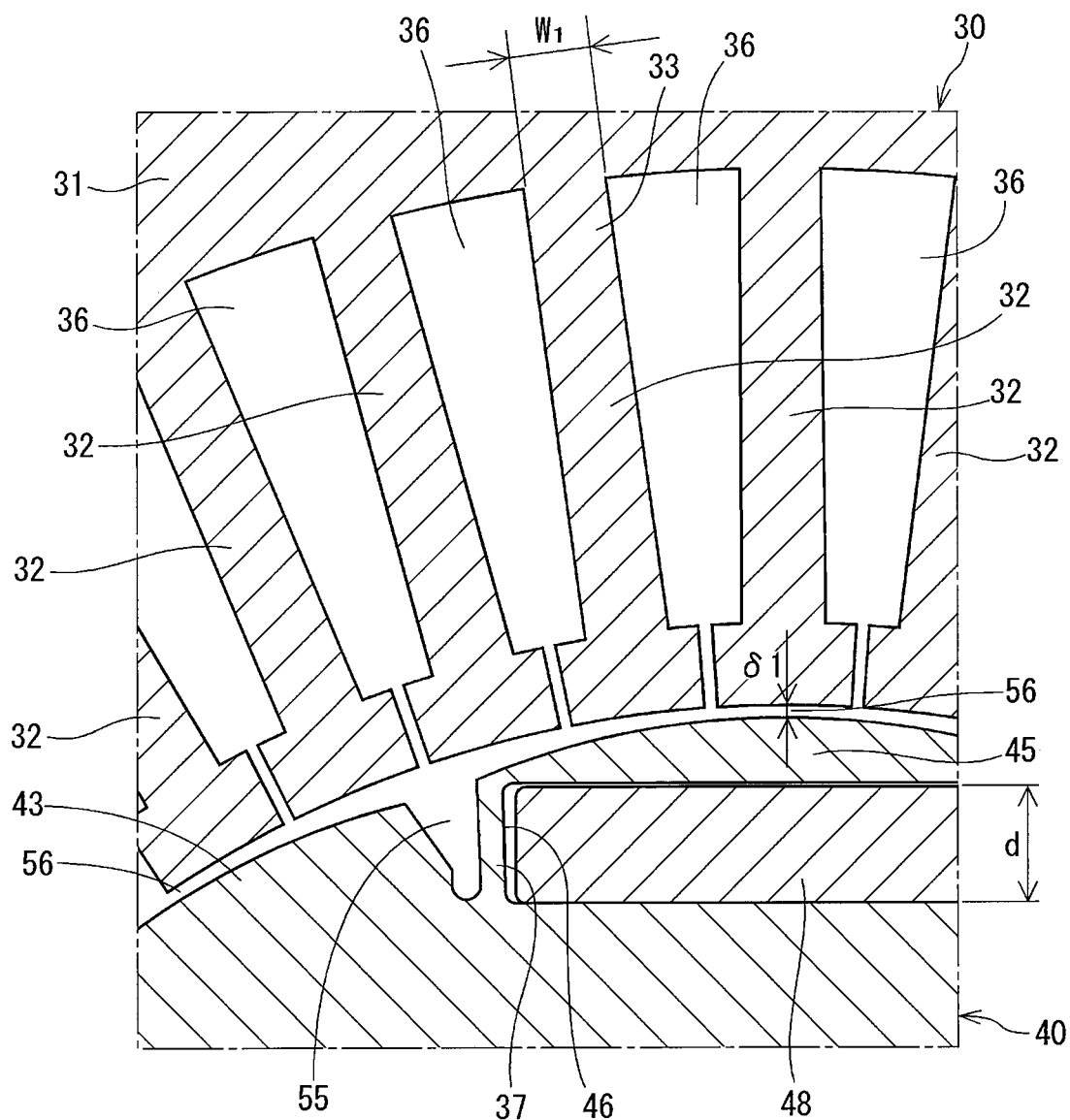
FIG. 5 is an enlarged view of FIG. 2 at a portion indicated by arrow V.

When a circumferential width of each one of the teeth 32 at its narrowest region in the leg portion 33 is designated as w1 in FIG. 5, the following relationship shown in an equation (8) is observed.

$$d0/p \geq 2w1 \quad (8)$$

When a length of a narrowest gap 56 in the radial direction between the rotor 40 and the teeth 32 is designated as δ1 in FIG. 5, the following relationship shown in an equation (9) is observed.

$$2w1 \leq d0/p \leq 2w1 + \delta1 \quad (9)$$

Figure 4:
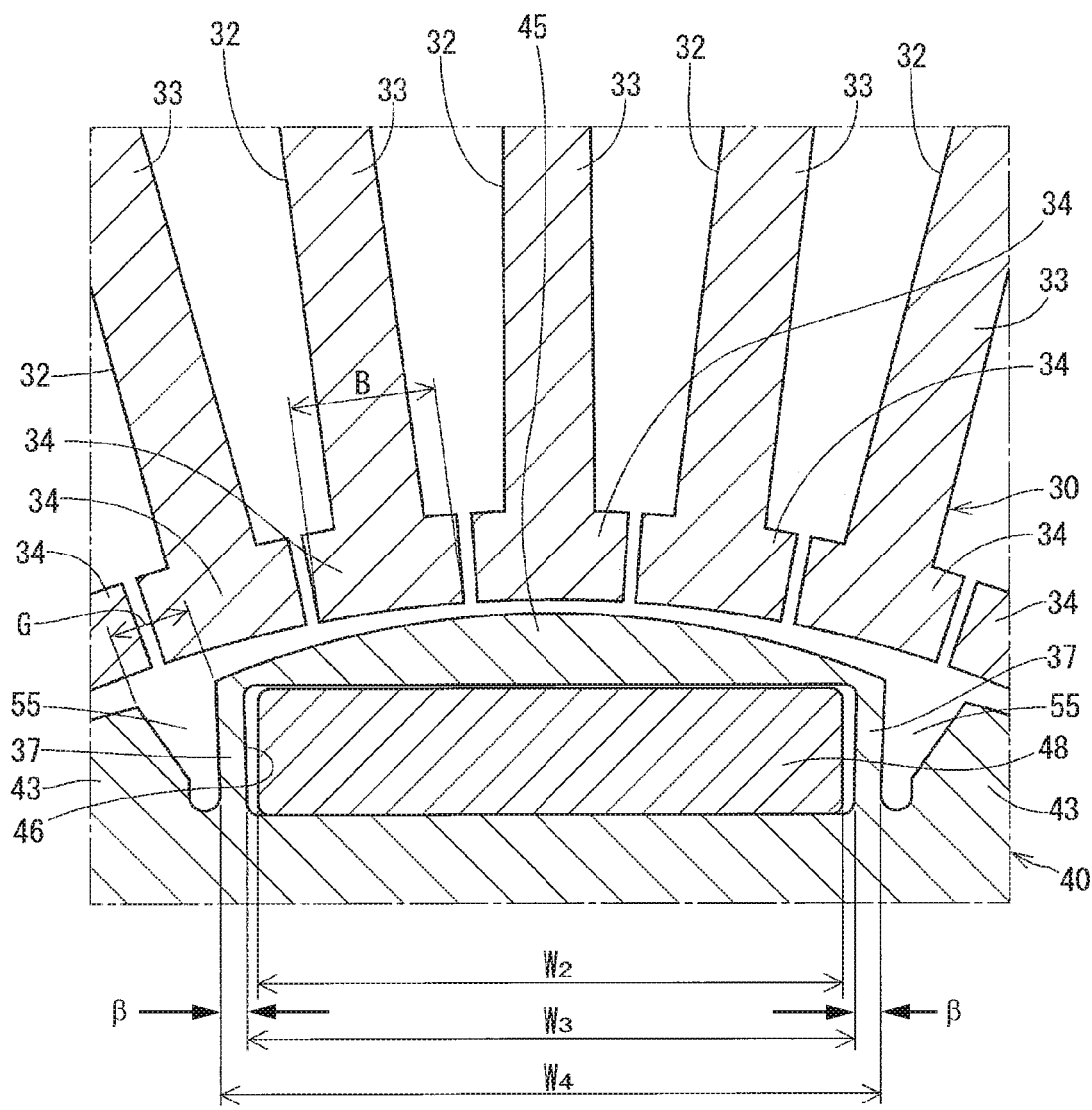
FIG. 4 is an enlarged view of FIG. 2 at a portion indicated by arrow IV.

When a thickness of the board member 50 is designated as t, and a circumferential width of the permanent magnet 48 is designated as w2 as shown in FIG. 4, and a circumferential width of the accommodation aperture 46 of the magnetic pole 45 is designated as w3 as shown in FIG. 5, the following relationship shown in an equation (10) is observed.

$$w3 \leq w2 + 2t \quad (10)$$

When a circumferential width of the magnetic pole 45 is designated as w4 as shown in FIG. 5, the following relationships shown in an equation (11) and in an equation (12) are observed.

$$w4 = w0/p + 2t + 2\beta \quad (11)$$

$$t \leq 2t \quad (12)$$

The magnetic pole 45 has a first convex surface 47 that protrudes outwardly in the radial direction. The soft magnetic material pole 43 has a second convex surface 44 that protrudes outwardly in the radial direction. A radius of curvature R1 of the first convex surface 47 is equal to a radius of curvature R2 of the second convex surface 44.

The gap between the first convex surface 47 and the teeth 32 and the gap between the second convex surface 44 and the teeth 32 are smallest at a center of the circumferential width of the convex surfaces 47, 44, and are wider toward both ends of the convex surfaces 47, 44.

As described above, the motor 10 in the present embodiment is designed to have a consequent-pole type rotor 40 that satisfies a relationship of the equation (6), which defines dimensions of the thickness d of the permanent magnet 48 and the circumferential width w of the soft magnetic material pole 43. In such manner, the magnetic flux distribution in the gap between the soft magnetic material pole 43 and the stator 30 is prevented from "spilling out" or from spreading in the circumferential direction, thereby preventing a magnetic flux density difference in the circumferential direction. Therefore, the space order components for the gap between the stator 30 and the rotor 40, other than the main component are prevented from having a larger magnitude, thereby enabling a reduction of the cogging torque.

Also, in the present embodiment, the gap 55 is disposed between the magnetic pole 45 and the soft magnetic material pole 43, as shown in FIG. 5. In FIG. 4, the circumferential width G of the gap 55 is smaller than the circumferential width B of the brim part 34, which is a top part of the teeth 32 of the stator 30. In such a configuration, the magnetic flux is formed to flow from the magnetic pole 45 toward the soft magnetic material pole 43 through the teeth 32 bridging the two poles 43, 45, which makes a time change of the magnetic flux in the gap smoother. Thus, the cogging torque of the motor 10 is further reduced.

Further, in the present embodiment, the winding method of the stator 30 is a full-pitch winding. Therefore, in comparison to a fractional-pitch winding, the circumferential width of the teeth 32 is made smaller, thereby enabling a reduction of the cogging torque due to the increase of the main and primary components of the cogging torque. That is, the drawback of the fractional-pitch winding, especially for the concentrated winding, is that such a winding should have an increased circumferential width of the teeth, which inevitably decreases the number of teeth on the rotor and which decreases the number of main/primary components of the cogging torque, thereby resulting in the increase of the cogging torque.

Moreover, in the present embodiment, the circumferential width w1 of the leg portion 33 of the teeth 32 and the thickness d of the permanent magnet 48 are set to satisfy the equation (8). Further, the thickness d of the permanent magnet 48 and the length 81 of the narrowest gap 56 in the radial direction between the rotor 40 and the teeth 32 are set to satisfy the equation (9). In such configuration, while providing a sufficient magnetic load that competes with or overcomes the magnetic resistance in the magnetic circuit at a no-load time, the amount of the rare-earth magnet used in the motor 10 is decreased. That is, in other words, the quantitative method described above enables an easy designing of an economical motor.

Additionally, in the present embodiment, the iron core of the rotor 40, which includes the rotor boss 42, the soft magnetic material pole 43 and the magnetic pole 45, is formed as layered board members 50 that are layered along the axial direction. Further, the circumferential width w of the soft magnetic material pole 43, the circumferential width w2 of the permanent magnet 48, the circumferential width w3 of the accommodation aperture 46 of the magnetic pole 45, the circumferential width w4 of the magnetic pole 45, and the thickness t of the board member 50 are set to satisfy the equations (10), (11) and (12). In such configuration, the amount of magnetic flux that short-circuits the permanent magnet 48 by passing through a side portion 37 of the accommodation aperture 46 in which the permanent magnet 48 is accommodated is effectively decreased, and the accommodation aperture 46 is easily formed by a press molding of the board member 50.

Also, in the present embodiment, the radius of curvature R1 of the first convex surface 47 of the magnetic pole 45 is the same as the radius of curvature R2 of the second convex surface 44 of the soft magnetic material pole 43. Further, the gap between the first convex surface 47 and the teeth 32 and the gap between the second convex surface 44 and the teeth 32 are respectively smallest at the center of the circumferential width of the convex surfaces 47, 44, and are wider toward both ends of the convex surfaces 47, 44. In such configuration, the above-described effects become more noticeable, and the cogging torque is more effectively decreased.

Even further, in the present embodiment, the motor 10 has the rotor 40 with an outer diameter is less than or equal to 60 [mm], and it is used as a power source of the vehicular electric power steering. Therefore, by using such a motor 10, a power steering system is made to have a smaller volume while its output is increased to have a greater value, for providing an improved and comfortable steering feel for the driver.

Other Embodiments

In an alternative embodiment of the present disclosure, the permanent magnet may be divided either in the circumferential direction or in the axial direction. In other words, plural permanent magnets may be inserted into one accommodation aperture.

In another alternative embodiment of the present disclosure, the number of magnetic poles in one motor may be other than ten. Further, the number of the slots may be other than 60.

In yet another alternative embodiment of the present disclosure, the motor may be used in a device other than the vehicular electric power steering.

Although the present disclosure has been fully described in connection with the above embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A rotating electric machine comprising:
   a rotor boss having a plurality of soft magnetic material poles extending radially outward from the rotor boss;
   a plurality of magnetic poles extending radially outward from the rotor boss and separated from the plurality of soft magnetic material poles by a circumferential gap;
   a permanent magnet that is buried in each of the plurality of magnetic poles;
   a yoke having a cylindrical shape that connects a plurality of teeth that are positioned along an inner periphery of the yoke and extend radially inward toward the rotor from the inner periphery of the yoke; and
   a winding disposed in a slot that is defined as a space between two teeth, wherein
   d0 is defined as a product of a radial thickness of the permanent magnet in millimeters and a number (p) of soft magnetic material poles,
   w0 is defined as a product of a circumferential width of each soft magnetic material pole extending radially outward from the rotor boss in millimeters and the number of soft magnetic material poles, and $360 \text{ millimeters} \leq (w0^2/d0) \leq 400 \text{ millimeters, and}$ G is defined as a circumferential width in millimeters of the circumferential gap on a circumferential edge of the rotor between each magnetic pole and each soft magnetic material pole,
   B is defined as a circumferential width in millimeters of an inner end of each tooth along an inner circumferential edge of the inner end of each tooth, and $G<B$.

2. The rotating electric machine of claim 1, wherein the winding is a full-pitch winding.

3. The rotating electric machine of claim 1, wherein an outer diameter of the rotor is less than or equal to 60 millimeters.

4. The rotating electric machine of claim 1, wherein the rotating electric machine is used in a vehicular electric power steering system.

5. The rotating electric machine of claim 1, wherein w1 is defined as a circumferential width of each tooth at a narrowest region of a leg portion of each tooth, and $d0/p \geq 2w1$.

6. The rotating electric machine of claim 5, wherein δ1 is defined as a length of a narrowest non-zero gap in the radial direction between the rotor and the plurality of teeth, and $2w1 \leq d0/p \leq 2w1+\delta1$.

7. The rotating electric machine of claim 1, wherein the rotor boss, the soft magnetic material pole, and the magnetic pole are formed as a plurality of layered board members that are layered along the axial direction, the magnetic pole has an accommodation aperture that houses the permanent magnet, t is defined as a thickness of each of the plurality of layered board member, w2 is defined as a circumferential width of the permanent magnet, w3 is defined as a circumferential width of the accommodation aperture of the magnetic pole, and $w3 \leq w2+2t$.

8. The rotating electric machine of claim 7, wherein w4 is defined as a circumferential width of the magnetic pole, β is a width along a circumferential direction of a side part on ends of the accommodation aperture, the side part enclosing ends of the permanent magnet, $w4=w0/p+2t+2\beta$, and $t \leq \beta \leq 2t$.

9. The rotating electric machine of claim 1, wherein the magnetic pole has a first convex surface extending radially outward, the soft magnetic material pole has a second convex surface extending radially outward, and the first convex surface has a radius of curvature that is equal to a radius of curvature of the second convex surface.

10. The rotating electric machine of claim 9, wherein a gap between the first convex surface and the plurality of teeth and a gap between the second convex surface and the plurality of teeth are respectively smallest at a center of the circumferential width of the convex surfaces, and respectively wider toward both ends of the convex surfaces.

11. A rotor for a rotating electric machine comprising:

a rotor boss having a plurality of soft magnetic material poles extending radially outward from the rotor boss;

a plurality of magnetic poles extending radially outward from the rotor boss and separated from the plurality of soft magnetic material poles by a circumferential gap; and a permanent magnet that is buried in each of the plurality of magnetic poles, wherein d0 is defined as a product of a radial thickness of the permanent magnet in millimeters and a number (p) of soft magnetic material poles, w0 is defined as a product of a circumferential width of each soft magnetic material pole extending radially outward from the rotor boss in millimeters and the number of soft magnetic material poles, and 360 millimeters$\leq (w0^2/d0) \leq 400$ millimeters.

12. A rotor for a rotating electric machine comprising:

a rotor boss;

a first plurality of salient magnetic poles that are soft magnetic material poles extending radially outward from the rotor boss; and a second plurality of salient magnetic poles extending radially outward from the rotor boss, separated from the plurality of soft magnetic material poles by a circumferential gap and with a permanent magnet buried in each of the second plurality of salient magnetic poles, wherein d0 is defined as a product of a radial thickness of the permanent magnet in millimeters and a number (p) of soft magnetic material poles, w0 is defined as a product of a circumferential width of each soft magnetic material pole in millimeters and the number of soft magnetic material poles, and 360 millimeters$\leq (w0^2/d0) \leq 400$ millimeters.

* * * * *